United States Patent [19]

Agger et al.

[11] Patent Number: 5,233,015
[45] Date of Patent: Aug. 3, 1993

[54] HIGH-MOLECULAR WEIGHT SYNTHETIC RESINS

[75] Inventors: Reginald T. Agger, Queniborough; Joginder S. Johl, Leicester, both of England

[73] Assignee: Bostik, Inc., Middleton, Mass.

[21] Appl. No.: 673,090

[22] Filed: Mar. 21, 1991

[30] Foreign Application Priority Data

Mar. 23, 1990 [GB] United Kingdom ............... 9006597

[51] Int. Cl.$^5$ .................... C08G 63/02; C08G 63/00
[52] U.S. Cl. ..................................... 528/272; 528/271
[58] Field of Search ............................... 528/272, 271

[56] References Cited

U.S. PATENT DOCUMENTS

| | | | |
|---|---|---|---|
| 3,306,875 | 2/1967 | Hay | 528/176 |
| 4,064,079 | 12/1977 | Sidebotham et al. | 528/272 |
| 4,328,331 | 5/1982 | Chen et al. | 528/291 |
| 4,393,186 | 7/1983 | Damico et al. | 528/49 |
| 4,618,635 | 10/1986 | Osborn et al. | 528/75 |
| 4,672,094 | 6/1987 | Nelb, II et al. | 528/84 |
| 4,707,535 | 11/1987 | Koleske | 528/76 |
| 5,066,762 | 11/1991 | Ohbuchi et al. | 528/65 |

FOREIGN PATENT DOCUMENTS 2008163 10/1978 United Kingdom .

OTHER PUBLICATIONS

Chemical Abstracts, vol. 63, Col. 3054 fgh by Zavaglia et al.
Chemical Abstracts, vol. 80, No. 15402 m, by Korshak et al.
Dissertation Abstracts, vol. 25, p. 3279, by Zavaglia.

*Primary Examiner*—John Kight, III
*Assistant Examiner*—T. Mosley
*Attorney, Agent, or Firm*—David G. Conlin; Linda M. Buckley; David S. Resnick

[57] ABSTRACT

High-molecular weight synthetic resins of polyhexamethylene adipates are disclosed with molecular weights greater than about 10,000, preferably greater than about 30,000, and a viscosity at 100° C. of at least about 300 poise, preferably exceeding 6000.

The polymerization is carried out with a ratio of diol/acid in the range 0.990 to about 1.03, preferably in the range of about 1.001 to about 1.01.

4 Claims, No Drawings

HIGH-MOLECULAR WEIGHT SYNTHETIC RESINS

The present invention relates to high-molecular weight synthetic resin materials prepared from hexane adipate which are tough, heat-formable and useful, for example, as stiffening materials.

Such materials are in demand, for example, as adhesives, sealants and as stiffening material for use in composite materials.

It is preferred that such material should be 'tough', that is, it should be resilient, flexible and non-cracking and preferably self-supporting. Such materials are particularly suitable where resilience must be retained after adhesive bonding.

Materials of this type have been produced using a very high molecular weight polycaprolactone having a molecular weight of 50 000 (est).

For many applications, temperatures above 100° C. are avoided because of likely damage to substrate materials. Generally, temperatures in the range of about 60° to about 125° C. are used, preferably about 85° to about 125° C. Thus, the requirement for such materials is that they should be relatively low-melting whilst associated with a high degree of stiffness-crystallinity to get the necessary toughness. This has hitherto been achieved by increasing molecular weight but this brings with it corresponding increases in viscosity. Hitherto known polyester materials, other than the above-mentioned polycaprolactones, did not exhibit the desired combination of properties, but our copending European patent application 0 323 700 discloses the production and use of tough, heat-formable, sheet materials and mouldable articles made therefrom comprising a high-molecular weight synthetic resin as stiffening component and characterized in that the stiffening component is provided as a highly-crystalline polyesterurethane formed by reacting polyester chains of relatively low m.w. with isocyanate.

However, such materials are subject to the usual objections against the use of isocyanates, i.e. they may be deemed to be hazardous, they can give rise to discoloration of polymeric products and there may be a risk of harmful by-products produced when burnt.

SUMMARY OF THE INVENTION

It is accordingly an object of the present invention to produce a polyester material having the above combination of properties, that is combining toughness with a relatively low melting point, without the need for urethane extension and reaction with isocyanate.

Surprisingly, it has been found that it is possible to achieve such properties in a polyester comprising hexamethylene adipate with high molecular weight produced without recourse to reaction with isocyanate to effect urethane extension.

According to the present invention tough, heat-formable, high-molecular weight synthetic resin materials comprising hexamethylene adipate is characterized by a molecular weight $M_n$ greater than about 10,000, preferably greater than about 30,000, and a viscosity measured using a Brookfield Model RVT—Thermocel biscometer set at 100° C. of at least about 300 poise, preferably about 6000 poise.

A preferred polyesterurethane disclosed in our European patent application 0 323 700 is based on polyhexamethylene adipate but until now such polyester adipate materials had only been produced with lower molecular weights, i.e., not exceeding 5000 without the urethane extension with isocyanate.

The polyhexamethylene adipate materials according to the present invention are useful as melt adhesives. They can be formed into glue-sticks for use in glue-guns, which prove to have good adhesion to surfaces such as PVC. They are especially suitable for use as laminating adhesives. For example, an excellent laminated worsted fabric was produced using an adhesive in accordance with the present invention as a powder of 0–600 microns at a coating weight of 43g/m$^2$ and activated in a press to a bond line temperature of 90° C. for about 5 seconds. This had a final peel strength of 20 N/25mm when pulled at 50 mm/min. The composition of the present invention can be used in stiffening shoe components as described and claimed in our copending U.K. application (folio 15100).

By tight control of reaction conditions, using a diol/acid ratio close to exactly molar in the range of about 0.990 to about 1.03, very low levels of catalyst and a temperature not exceeding 232° C., we have produced hexamethylene adipate polymer of exceptionally high molecular weight $M_n$ greater than about 10 000 and even greater than about 30 000. Surprisingly, we have also found out that the reaction to produce high molecular weight polyhexamethylene adipate can be considerably speeded up by using a minute excess of diol with a diol/acid ratio in the range of about 1.001 to about 1.01. The reaction is carried out in a reflux reactor under an inert atmosphere (nitrogen) and after the temperature of the distillation column drops, the pressure is slowly reduced and maintained at a low pressure (about half an atmosphere) for an initial phase and the reaction then completed after addition of further catalyst under a very low pressure (close to complete vacuum). The resulting high-molecular weight polyester material exhibits excellent properties, with high crystallinity and a melting point below 90° C.

In order that the invention be better understood, a preferred Example will now be described in greater detail by way of example.

EXAMPLE

The reaction was initiated by reacting the following ingredients in a reflux reaction under nitrogen

| | |
|---|---|
| hexane diol | 42.22 kg |
| adipic acid | 51.98 kg |
| tetrabutyl titanate | 10 g |
| dibutyl tin oxide | 1.6 g |

The distillation column of the reflux reactor was maintained at a temperature not exceeding 100° C. When the column temperature dropped, the pressure was slowly reduced to 0.5 bar and maintained for ½ hour, not allowing the temperature of the reaction mixture to exceed 230° C. A further 12 g of tetrabutyl titanate was added, the pressure further reduced to approximately 0.5 mbar and the temperature maintained at 230° C. until the desired viscosity of the polymer was achieved. (about 550 poise melt viscosity using a Brookfield Model RVT—Thermocel set at 230° C.).

In order to achieve high molecular weight polyhexamethylene adipate, it is necessary to maintain the molar ratio of diol/acid very strictly, in the ratio of about 0.990–1.03. Surprisingly we have also found that the reaction to produce high molecular weight polyhexamethylene adipate can be considerably speeded up by using minute excess of hexane diol, with a diol acid ratio in the range of about 1.001 to 1.01 For example, it takes 8 hours to produce hexamethylene adipate of molecular weight $M_n$ 30,000 using a diol/adipate ratio of precisely 1.00 whereas this material can be achieved in 3½ hours using a diol/adipate ratio of 1.005. The major part of the condensation is carried out with very low catalyst levels (down to about 20 poise/100° C. with acid value 12 mg/g KOH) but further catalyst is required to complete the polymerization after the acid level drops.

Compositions of polyhexamethylene adipate according to the present invention may be prepared by the incorporation of filler, pigments and the like in accordance with known practices.

The properties of polyhexamethylene adipate of about 40,000 $M_n$ mw can match, or surpass, for example, the properties of CAPA (RTM) 650, a polycaprolactone with a mw of about 50,000 sold by Interox, and of a polyesterurethane according to European patent application 0 323 700. The polyhexamethylene adipate has a ball and ring softening point to 80° C. compared with 85° C. for both the aforementioned materials, all three having a viscosity of about 13,000 poise melt viscosity measured using a Brookfield Model RVT—Thermocel viscometer set at 100° C. 1 mm sheets of all three materials can be bent at room temperature without cracking, although they are somewhat stiff, the polycaprolactone being somewhat stiffer than the other two sheet materials. On an arbitrary scale where 0 indicates floppy flexibility, 1 indicates that the sheet is easily bent and 2 indicates rigidity, the polyhexamethylene adipate and the polyesterurethane are each ascribed values of 1¼ and the polycaprolactone is ascribed a value of 1¾.

It is understood that the examples and embodiments described herein are for illustrative purposes only, and that various modifications or changes in light thereof that will be suggested to persons skilled in the art are to be included in the spirit and purview of this application and the scope of the approved claims.

We claim:

1. A high-molecular weight hexamethylene adipate resin wherein the resin has a molecular weight $M_n$ greater than about 10,000, a melt viscosity measured at 100° C. of at least about 300 poise and being free of isocyante groups.

2. A high-molecular weight resin according to claim 1 where the resin has a molecular weight $M_n$ greater than about 30,000 and a melt viscosity measured at 100° C. at least 6,000 poise.

3. A method of producing a high-molecular weight synthetic resin according to claim 1 or 2, the method comprising reacting hexane diol and adipic acid, wherein the reaction is carried out with a diol/acid ratio in the range of about 1.001 to about 1.01.

4. A method of producing a high-molecular weight systheic resin according to claim 3, wherein the reaction is carried out with a diol/acid ratio of about 1.005.

* * * * *